United States Patent [19]
de Gennes

[11] 3,958,667
[45] May 25, 1976

[54] DISC-BRAKES, ESPECIALLY FOR AUTOMOBILE VEHICLES

[75] Inventor: Marie Alfred Gerard de Gennes, Senlis, France

[73] Assignee: Societe Anonyme Francaise du Ferodo, Paris, France

[22] Filed: Feb. 15, 1974

[21] Appl. No.: 442,898

[30] Foreign Application Priority Data
Feb. 21, 1973 France .............................. 73.06074
Nov. 16, 1973 France .............................. 73.40830

[52] U.S. Cl. .............................. 188/73.3; 188/73.1; 188/73.6; 188/243
[51] Int. Cl.² .................. F16D 55/224; F16D 65/02
[58] Field of Search ................. 188/72.5, 72.4, 73.3, 188/73.5, 73.1, 250 B, 234, 242, 243, 73.6

[56] References Cited
UNITED STATES PATENTS

| | | | |
|---|---|---|---|
| 1,465,975 | 8/1923 | Emery | 188/243 |
| 3,166,159 | 1/1965 | Burnett | 188/73.3 |
| 3,265,160 | 8/1966 | Elberg et al. | 188/73.6 |
| 3,291,262 | 12/1966 | Rosanowski et al. | 188/73.3 |
| 3,346,076 | 10/1967 | Hayes | 188/73.3 |
| 3,368,647 | 2/1968 | Laverdant | 188/73.3 |
| 3,403,756 | 10/1968 | Thirion | 188/73.3 |
| 3,548,973 | 12/1970 | Laverdant | 188/72.5 |
| 3,625,314 | 12/1971 | Rinker | 188/72.4 |
| 3,819,015 | 6/1974 | Silberschlag | 188/73.3 |

FOREIGN PATENTS OR APPLICATIONS
1,207,328 9/1970 United Kingdom ................ 188/73.3

Primary Examiner—George E. A. Halvosa
Attorney, Agent, or Firm—Young & Thompson

[57] ABSTRACT

An improved disc-brake, more particularly intended for automobile vehicles, having a reduced number of component parts, easier assembly and lower production cost. The brake is of the kind comprising a fixed support, a disc keyed on a rotatable shaft to be braked, two brake-shoes disposed on each side of the disc and movable perpendicularly to the plane of said disc, a transfer member movable perpendicularly to the plane of the disc, a hydraulic control unit adapted to act directly on a first brake-shoe and on the second brake-shoe through the intermediary of the transfer member, and an elastic device for urging the transfer member into abutment against retention stops formed on the fixed support. Two of the retention stops against which the transfer member is in abutment are constituted by brackets carried by the fixed support from which they project on each side of the transfer member, this transfer member further comprising laterally projecting lugs for co-operating with the brackets.

36 Claims, 10 Drawing Figures

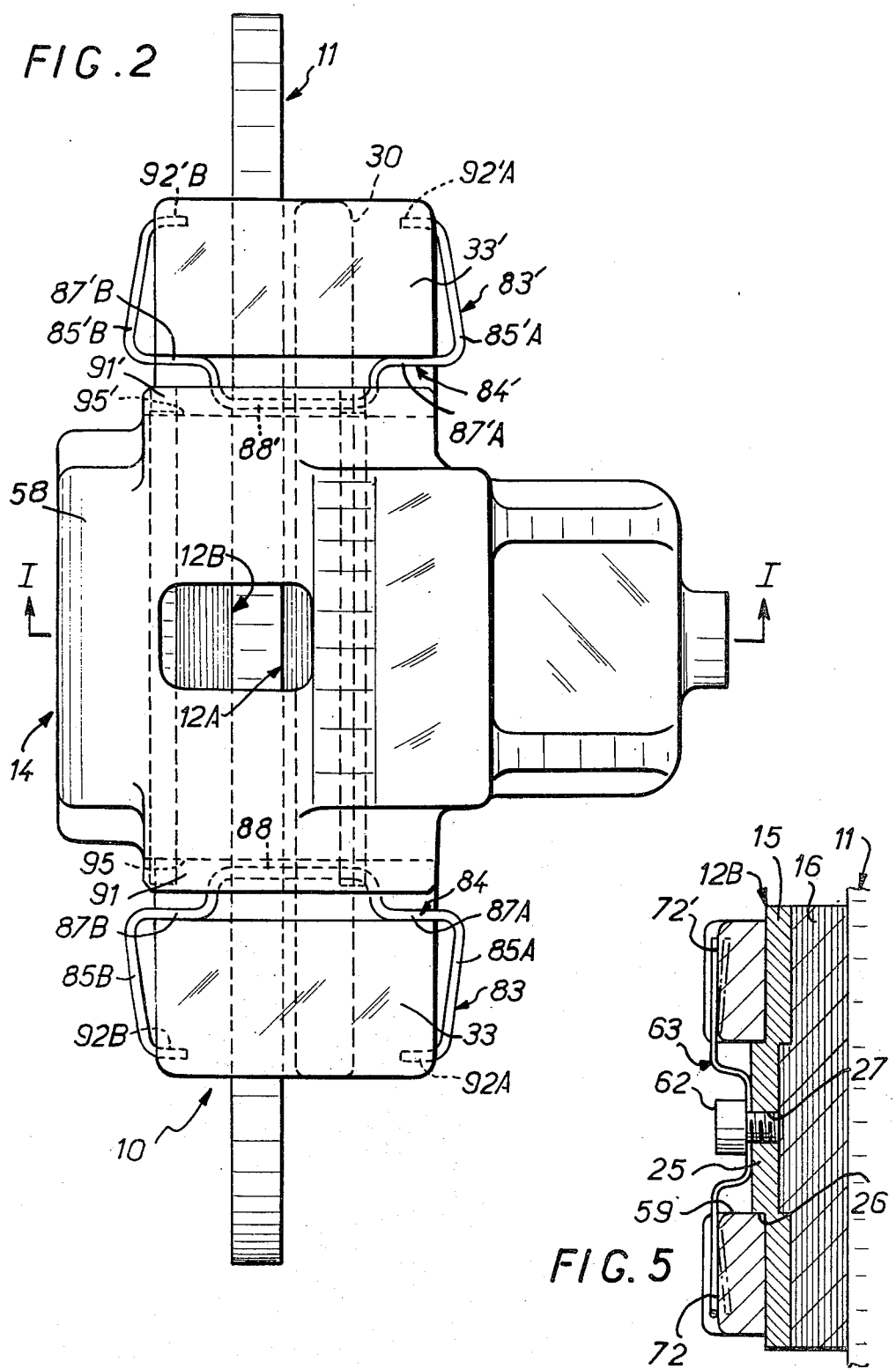

DISC-BRAKES, ESPECIALLY FOR AUTOMOBILE VEHICLES

The present invention relates generally to disc-brakes which, more particularly intended for automobile vehicles, comprise a fixed support, a disc rotatably mounted and adapted to be keyed on a shaft to be braked, two brake-shoes arranged on each side of this disc and movable perpendicularly to the plane of this latter, a hydraulic control unit adapted to act on the one hand directly on a first of the said brake-shoes and on the other on the second of the said brake-shoes, through the intermediary of a transfer member, and elastic means which urge the said transfer member into contact against retaining stops provided for that purpose on the fixed support.

The present invention has for its object an improved brake of this kind.

This disc-brake is generally characterized in that two of the retaining stops which are rigidly secured to its fixed support and against which the transfer member is in contact, are formed by two brackets which carry the said fixed support as a projection, the transfer member being provided laterally with two projecting studs for co-operating with the said brackets; the said studs are preferably formed by the extremities of a small bar removably engaged in the transfer member, perpendicular to the axial plane of symmetry of the brake.

The number of parts necessary for the construction of this brake is thus still further reduced, its assembly is correspondingly facilitated and its production cost is reduced in consequence.

In addition, in the case of a cylindrical bar, the said studs only bear on the associated brackets by a surface which is advantageously reduced to one of their generator lines.

In all cases, the contacts of the transfer member with its contact stops are advantageously self-cleaning, and this transfer member is only in contact against three stops, two arranged on the side of the disc corresponding to the first brake-shoe and the third arranged on the other side of the disc, on the second brake-shoe.

In addition, the elastic means which urge the transfer member into contact against the retention stops secured to the fixed support preferably comprise two bending springs which are arranged on each side of the transfer member, each of the said springs comprising a supporting zone by which it is in contact with the transfer member and with the fixed support, and at least one lever arm, by the extremity of which it is hooked on the said fixed support.

By means of this lever arm, provided of sufficient length for that purpose, this spring can easily be put under tension without it being necessary to apply to it an excessive effort, and the assembly and dismantling of the brake are thereby facilitated.

Furthermore, at least one of the brake-shoes fitted on the brake according to the invention is of the kind comprising a support plate carrying on one of its faces a friction lining, and is characterized in that the said plate is provided transversely projecting on the other face, a boss with a closed contour, and in that, furthermore, the said plate is provided laterally and on each side, as shoulders on its edge, entensions which respectively terminate in supporting faces, for example flat, parallel, and preferably co-planar.

On both the sides of the disc, these extensions ensure the radial retention of the corresponding shoes, the end supporting faces of these extensions coming into contact against the radial retention stops provided for that purpose on the fixed support, the circumferential retention of the brake-shoes being effected furthermore in the usual manner by the lateral edges of the shoes.

On the side of the disc opposite to the hydraulic control unit, the boss which comprises the corresponding brake-shoe is engaged in a housing which includes for that purpose the transfer member, and which is at least partly complementary to the said boss, which contributes to the coupling of this brake-shoe with the said transfer member, in particular for the transfer of the corresponding braking torque.

On the side of the disc corresponding to the hydraulic control unit, the boss of the brake-shoe on which this control unit acts directly, does not interfere in any way with the possibility of this action.

In consequence, the two brake-shoes of the same brake may therefore advantageously be identical and therefore interchangeable, which permits of extensive standardization of these brake-shoes and in consequence results in a reduction of the production cost of these shoes.

Fixing means are preferably established between the transfer member and the shoe on which this member acts, and these fixing means comprise a screw engaged by screwing into a threaded hole provided for that purpose in the boss of the said brake, and also an elastic bar supported at its central zone on the said screw, and at its extremities, on each side, on the transfer member.

According to a preferred form of embodiment, this elastic bar is put under pre-stress in position, and it thus urges the brake-shoe concerned into application against the transfer member.

This brake-shoe is thus strengthened in a particularly sure manner on the transfer member, which facilitates the adoption of the advantageous known arrangement, in which, on the corresponding side of the disc, the radial retention of the transfer member is effected through the said shoe.

Thus, according to this aspect, a brake in accordance with the invention, which is of the kind referred to above, is characterized in that the brake-shoe on which the transfer member acts comprises a boss and two lateral extensions terminating in supporting faces, the said transfer member comprises a housing which is at least in part complementary to the said boss, and in which this latter is engaged, and the lateral extensions of the said brake-shoe are supported by their end faces against radial retention stops provided on the fixed support, so that the said transfer member is supported against the said radial retention stops through the intermediary of the said brake-shoe and successively through a part of the lateral flank of the housing with which it is provided for the reception of the boss of this shoe, the corresponding part of the lateral flank of this boss and the lateral extensions of the said shoe.

The fixed support of a brake of this kind has preferably an overall configuration in the shape of a T and comprises on the one hand an end-plate substantially parallel to the disc, the said end-plate comprising a slot in its central zone for the housing of the brake-shoe on which the hydraulic control unit acts directly and, on each side of the said slot, two brackets which extend substantially perpendicularly to the said end-plate, on each side of this plate, along its edge closest to the periphery of the disc.

This configuration provides a particularly effective guiding action of the transfer member perpendicular to the plane of the disc, it being possible to carry out this guiding over a greater length by means of the brackets forming the bar of the T corresponding to the said configuration.

Furthermore, this configuration facilitates a layout of the elastic means associated with the transfer member such that these elastic means act on this member substantially at the barycentre of the support reactions corresponding to the radial retention of this transfer member.

From these two aspects, namely better guiding and better balancing of the forces applied to the transfer member, it results that this member may have a simple and advantageously concentrated configuration favorable to its mechanical strength and therefore to its long life.

The characteristic features and advantages of the invention will furthermore be brought out in the description which follows below by way of example, reference being made to the accompanying diagrammatic drawings, in which:

FIG. 2 is a plan view of this brake taken in the direction of the arrow II of FIG. 1;

FIG. 5 is a partial view in cross-section of this brake, taken along the line V—V of FIG. 1;

According to the form of construction shown in these drawings, the brake according to the invention comprises generally a support 10, a disc 11, rotatably mounted and capable of being keyed on a shaft to be braked, two brake-shoes 12A, 12B mounted on each side of the disc 11 and movable perpendicularly to the plane of this latter, and a hydraulic control unit 13 adapted to act on the brake-shoe 12A directly and also on the brake-shoe 12B through the intermediary of a transfer member 14.

According to one aspect of the invention, the brake-shoes 12A, 12B are identical in form and in dimensions and are therefore interchangeable.

Figure 6:
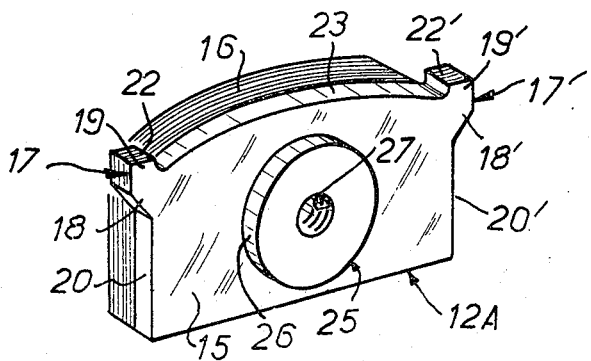
FIG. 6 is a view in perspective of a brake-shoe according to the invention.

Only one of these shoes will be described below, namely the shoe 12A, with reference to FIG. 6, in which such a shoe is shown separately.

A brake of this kind comprises in known manner a supporting plate 5 carrying on one of its faces a friction lining 16 rigidly fixed to the support plate 15 by any appropriate means such as by glueing, riveting or the like.

The supporting plate 15 has generally a rectangular shape and from two of its adjacent corner zones extensions 17, 17' are provided laterally on each side and projecting as shoulders from its edge.

Each of these extensions comprises successively a first section 18, 18' oblique with respect to the edge 20, 20' of the plate from which it is formed, and a second section 19, 19' substantially parallel to the said edge.

The extensions 17, 17' terminate in supporting faces 22, 22' which, in the example shown, are flat, parallel to each other and co-planar.

In the example shown, these supporting faces 22, 22' are perpendicular to the edge 20, 20' of the plate 15 from which they are formed.

Between the extensions 17, 17', the edge 23 of the plate 15 is slightly convex, and in practice circular, with a radius equal to the radius of the disc 11.

At the same time, the plate 15 is provided transversely with a boss 25 having a closed contour and projecting from the face of the plate opposite to that which carries the friction lining 16.

In the example shown, this boss 25 is produced by punching out the plate 15 and is wholly at a distance from the peripheral contour of the plate.

Also in the example shown, this boss 25 is a boss with a cylindrical flank 26 having a circular contour.

In its central zone, the boss 25 is pierced with an internally threaded hole 27.

Figure 8:
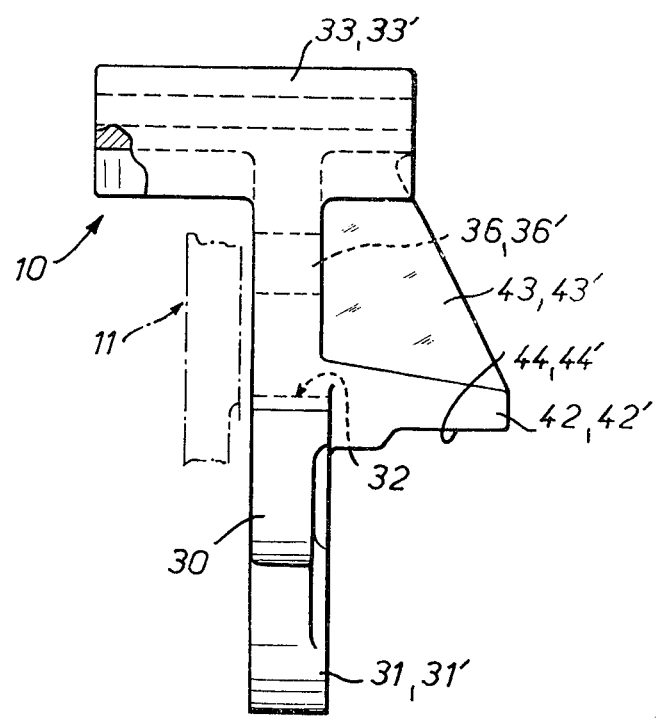
FIG. 8 is a side view with parts broken away of the fixed support of this brake, taken separately.

Preferably and as shown in the drawings and in particular in FIG. 8, the fixed support 10 has generally the shape of a T and comprises an end-plate 30 which is substantially parallel to the plane of the disc 11 which is provided along its edge farthest away from the periphery of the disc with two fixing lugs 31, 31' and which comprises in its central zone and close to its edge which is nearest to the periphery of the disc 11, a generally quadrangular slot 32, and also, on each side of the said slot, there are two brackets 33, 33' which extend substantially perpendicularly to the end-plate 30 and on each side of this latter, along its edge which is nearest to the periphery of the disc.

The brackets 33, 33' thus project transversely on each side of the end-plate 30, parallel to the axis of the disc 11, and in particular, on the side of the disc 11, they overhang the peripheral edge of this latter and extend beyond the said edge.

Figure 3:
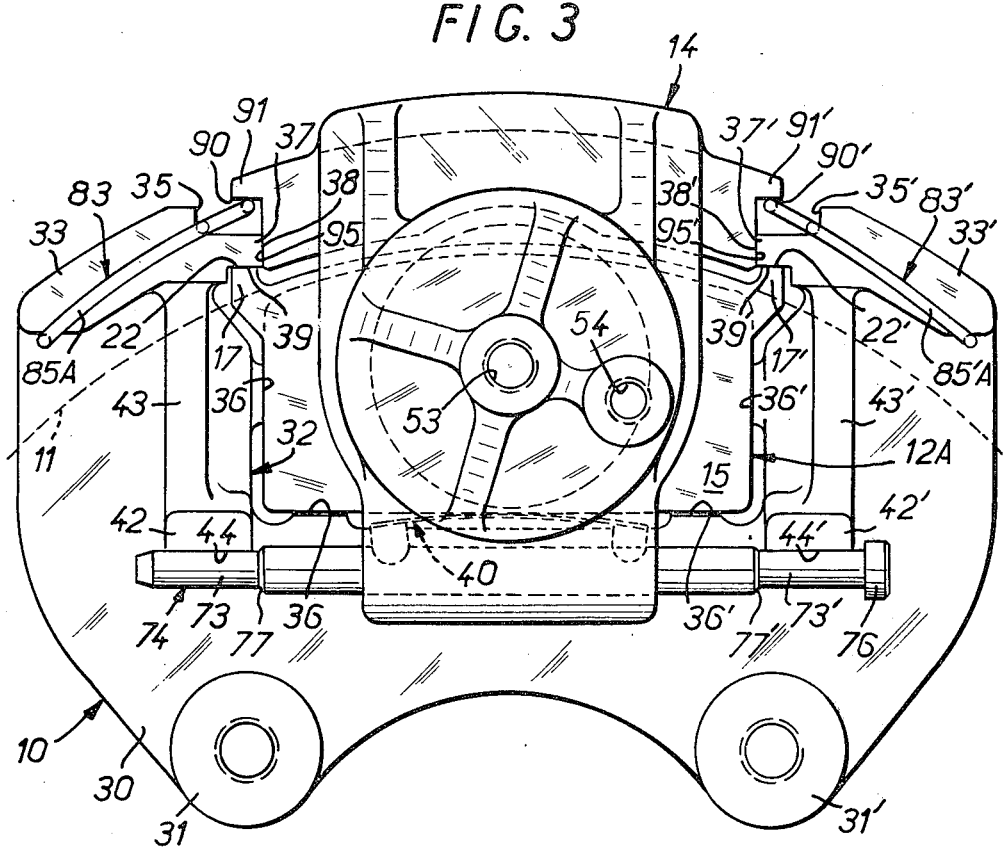
FIGS. 3 and 4 are side views of this brake taken respectively in the directions of the arrows III and IV of FIG. 1.
Figure 4:
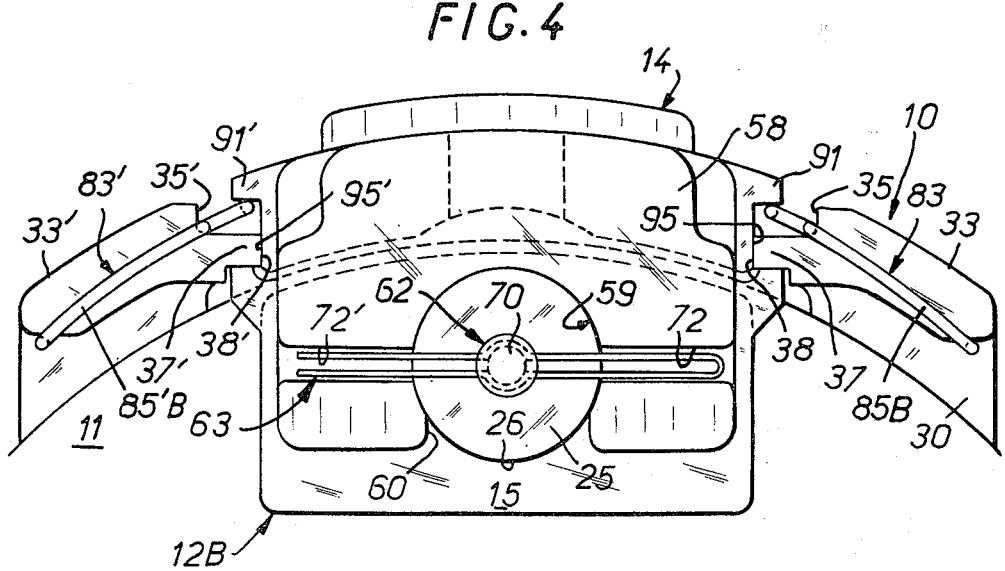

In the example shown, and as can be seen from FIGS. 3 and 4, the brackets 33, 33' belong substantially to the same cylindrical surface which, if it were assumed to be extended for that purpose, would enclose the disc 11 at a distance from this latter.

Externally and facing each other, the brackets 22, 33' each have shoulders 35, 35' forming a substantially re-entrant right-angle, the purpose of which will be explained below.

The slot 32 of the end-plate 30, the bottom of which is substantially perpendicular to the radial plane of symmetry of the brake, and the sides of which are substantially parallel to the said plane, is provided at intervals with supporting surfaces 36 forming conjointly the housing for the brake-shoe 12A.

In the vicinity of the brackets 33, 33', the walls of the slot 32 become flared and are coupled to projections 37, 37' which extend the brackets 33, 33' and are directed towards each other.

The opposite faces 38, 38' of these projections 37, 37' are parallel to each other and are also parallel to the radial plane of symmetry of the brake. They form guiding surfaces for the transfer member 14, as will become clear later.

The faces 39, 39' of the projections 37, 37' which are directed towards the bottom of the notch 32 are substantially perpendicular to the radial plane of symmetry of the brake and are co-planar.

They constitute radial retention stops for the brake-shoes 12A, 12B, as will become clear later.

In fact, in the case of the shoe 12A, this latter is subjected to the action of a spring 40 which, being supported against the bottom of the notch 32, urges it in the direction of the periphery of the disc 11, but this shoe 12A is retained radially in this direction by the contact of the lateral extensions 17, 17' of its plate 15, by their end faces 22, 22' against the retaining stops 39, 39' provided for that purpose on the fixed support 10.

In the vicinity of its fixing lugs 31, 31', the end-plate 30 of the support 10 also carries projecting brackets 42, 42', which extend perpendicularly to the end-plate 30 and which are coupled to the corresponding brackets 33, 33' by stiffening ribs 43, 43'.

The lower faces 44, 44' of the brackets 42, 42' are substantially flat and co-planar and extend approximately perpendicularly to the radial plane of symmetry of the brake.

In the example shown, the hydraulic control unit 13 comprises a blind cylinder 46 which is formed integrally with the transfer member 14.

In this cylinder 44 is slidably mounted a piston 47 which acts directly on the brake-shoe 12A.

This piston 47 is hollowed-out axially so as to form a recess 48 in a manner known per se.

The piston 47 is engaged by its recess 48 around the boss 25 of the shoe 12A, so that this boss 25 does not in any way interfere with the action of the piston 47, the edge of which bears against the plate 15 of the shoe 12A, around the boss 25 in question.

It will of course be understood that the piston 47 could also bear by its bottom against this boss.

The piston 47 and the blind cylinder 46 form conjointly a chamber 50, the fluid-tightness of which is ensured by a joint 51 housed in an annular groove 52 formed for that purpose in the cylinder 46.

The chamber 50 communicates with the exterior by a supply nozzle 53 for fluid under pressure and also by a blow-out nozzle 54.

Taking into account the cylinder 46 which forms an integral part of it, the transfer member 14 has the general configuration of a U, and is engaged substantially radially on the disc 11, the brake-shoes 12A, 12B being on each side of the disc, and the fixed support 10.

The arm 58 of the transfer member 14 which is located on the side of the disc 11 opposite to the cylinder 46 is recessed to form a housing 59 which is at least partly complementary to the boss 25 of the corresponding brake-shoe 12B.

In the example shown, this housing 59 is opened laterally and downwards by a slot 60 having a width less than the corresponding dimension of the boss 25 of the brake-shoe 12B.

The boss 25 of the brake-shoe 12B is engaged in the housing 59 of the transfer member 14, but this latter, on account of the slot 60 only encloses it over a part of its periphery, greater than half the periphery.

Fixing means are provided between the brake-shoe 12B and the transfer member 14.

These fixing means comprise a screw 52 engaged by screwing into the threaded bore 27 in the brake-shoe 12B and an elastic bar 63 supported in its central portion on the screw 62 and at its extremities on each side of the transfer member 14.

Figure 7:
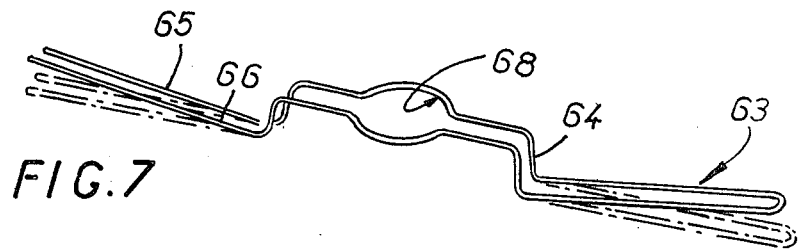
FIG. 7 is a perspective view to a larger scale of a fixing bar associated with one of the brake-shoes according to the invention.

As shown separately in FIG. 7, this elastic rod 63 is a U-shaped pin, the central portion 64 of which is offset transversely, perpendicular to the mean plane formed by the remainder of its two arms 55, 56, the two arms 55, 56 in question being deformed transversely, parallel to the said plane, in the central zone of the said central portion 64, so as to form conjointly a substantially circular opening 68.

The elastic rod 63 is engaged through this circular opening 68 underneath the head 70 of the screw 62, while its extremities are laterally supported on the transfer member 14, on the bottoms of grooves 72, 72' formed radially on this member, on each side of the housing 59 which it comprises.

Preferably, and as shown, the elastic rod 63 is in position under pre-stress, and thus urges the brake-shoe 12B into application by its plate 15 against the internal face of the corresponding arm 58 of the transfer member 14.

In practice, and as illustrated in full lines in FIG. 7 and in dotted lines in FIG. 5, the extremities of the elastic rod 63 form conjointly a dihedron open in the direction of the central portion 64 of this rod, while in position, supported against the transfer member 14 and as shown diagrammatically in broken lines in FIG. 7, these extremities are in line with each other.

In addition, the transfer member 14 is provided laterally with two studs 73, 73' in contact with the said flat lower surface 44, 44' of the brackets 42, 42'.

In the example shown, these studs 73, 73' are formed by extremities of smaller diameter of a cylindrical rod 74 engaged with play in a bore 75 of the transfer member, perpendicular to the axial plane of symmetry of the brake.

One of the extremities of this rod 74 is provided with a head 76 facilitating the engagement of a possible dismantling tool.

The shoulders 77, 77' providing the coupling between the smaller-diameter extremities 73, 73' of the rod 74 and the central portion of this latter advantageously form abutments capable of acting in co-operation with the corresponding edges of the brackets 42, 42' of the fixed support in order to ensure the axial retention of this rod when once the transfer member 14 is subjected to the elastic means which are applied to it, as will become apparent later, the said elastic means being arranged between the fixed support 10 and the transfer member 14.

In the example shown, these elastic means comprise two bending springs 83, 83' each having generally the shape of a U and arranged on each side of the transfer member 14, each of these springs comprising a central portion 84, 84' forming a supporting zone by which it is in contact against the transfer member 14 and against the fixed support 10, and also lateral arms 85A, 85'A and 85B, 85'B forming lever arms by the extremity of which it is hooked on the said fixed support.

The springs 83, 83' are for example of round wire suitably shaped and bent.

In the example shown, the supporting zone 84, 84' of each of these springs comprises three successive support areas, of which two lateral areas 87A, 87B and 87'A, 87'B are in contact with the fixed support 10 against the shoulders 35, 35' provided for that purpose on the brackets 33, 33' of the support, and in which the third 88, 88' intermediate between the lateral supporting areas 87A, 87B, 87'A, 87'B, is in contact with the transfer member 14 on the lower face 90, 90' of projections 91, 91' provided for that purpose on the transfer member 14, the said projections extending substantially parallel to the axis of the disc.

In the examples shown, the intermediate support area 88, 88' is thus in contact with the transfer member 14, while the lateral supporting areas 87A, 87B, 87'A, 87'B are in contact with the fixed support 10, but it will be obvious that the reverse arrangement could be adopted.

The lateral arms 85A, 85B and 85'A, 85'B of the springs 83, 83' form lever arms and comprise at their free extremities hooked retention portions 92A, 92B and 92'A, 92'B which enable them to be engaged underneath the brackets 33, 33' of the fixed support 10, on each side of the end-plate 30, for maintaining them in the working position.

As will be easily understood, the springs 83, 83' act radially on the transfer member 14, from the shaft of the disc 11 to the periphery of this disc.

On the side of the disc corresponding to the cylinder 46, the transfer member 14 is retained by the rod 56.

On the opposite side of the disc 11, the transfer member 14 is retained radially by the brake-shoe 12B, the extensions 17, 17' of which are in contact by their end faces against the radial retention stops 39, 39' provided for that purpose on the fixed support 10.

Thus, on this side of the disc 11, the transfer member 14 is in contact against the retention stops 39, 39' of the fixed support 10 successively through the portion of the lateral flank of the housing 59 with which it is provided, which is immediately in the vicinity of the slot 60 of the housing, the corresponding portion of the lateral flank 26 of the boss 25 of the brake-shoe 12B engaged in this housing, and the lateral extensions 17, 17' of the plate 15 of the said brake-shoe.

Vertically in line with its projections 91, 91', the transfer member 14 comprises flat surfaces 95, 95' parallel to each other and to the radial plane of symmetry of the brake, for co-operation with the guiding surfaces 38, 38' provided for that purpose at the end of the projections 37, 37' of the fixed support 10.

Figure 1:
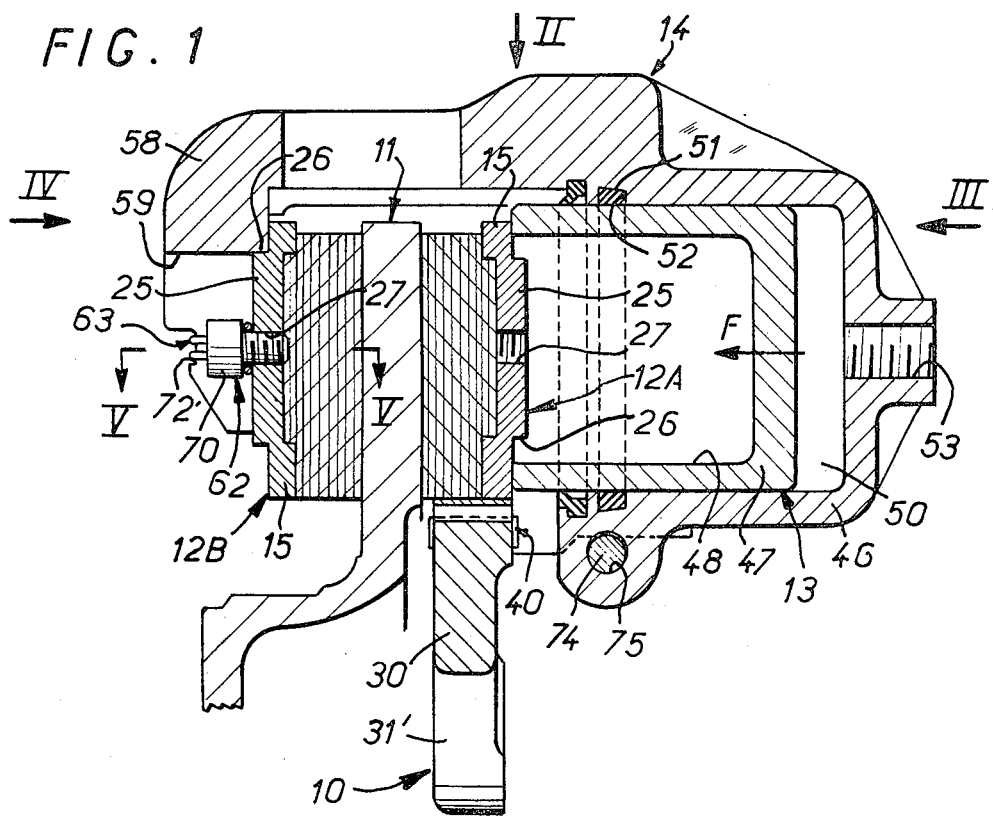
FIG. 1 is a view in axial section of a brake according to the invention, taken along the line I—I of FIG. 2.

In operation and when fluid under pressure is sent into the chamber 50, the piston 47 moves perpendicularly to the plane of the disc 11 following the arrow F of FIG. 1, and it applies the brake-shoe 12A against the disc 11; conjointly, the cylinder 46 and therefore the transfer member 14 also move perpendicularly to the plane of the disc 11 in the direction opposite to that of the arrow F, and applies the brake-shoe 12B against the disc 11. The disc 11 is therefore gripped by the brake-shoes 12A, 12B and is therefore braked, if so desired, until it stops.

When the oil pressure in the chamber 50 is released, the disc 11 becomes freed.

There will be appreciated the identical nature of the brake-shoes 12A, 12B and the effective guiding of the transfer member 14 perpendicularly to the plane of the disc 11 by virtue of the guiding surfaces 38 of the fixed support 10 which co-operate with complementary surfaces 95, 95' of this transfer member. The concentrated and compact form of the transfer member will also be appreciated, and finally also, by virtue of the fact that the brackets 33, 33' of the fixed support 10 extend on each side of the endplate 30 of the support, which gives this fixed support its particular shape in the form of a T, the component of the forces applied by the springs 83, 83' on this transfer member 14 passes substantially through the barycentre of the radial retention reactions also applied on this transfer member, which gives an excellent equilibrium to this member and prevents any accidental jamming. In fact, the supporting zones 84, 84' of the bending springs 83, 83' are displaced as a whole axially with respect to the disc 11, their intermediate supporting zones 88, 88' extending beyond the edge of this disc, and their lateral supporting zones 87A, 87'A bearing on the part of the brackets 33, 33' of the fixed support which extends on the side of the hydraulic control unit 13.

Furthermore, due to the fact that the bending springs 83, 83' according to the invention comprise lever arms 85A, 85B, 85'A, 85'B, and provided that the latter have a sufficient development, the putting of these springs under tension can be effected by applying a moderate force to the lever arms, which facilitates the assembly of the brake.

For dismantling the brake, for example for the purpose of obtaining access to the brake-shoes 14A, 14B for their replacement, it is only necessary to disengage the lever arms 85A, 85B and 85'A, 85'B of the springs 83, 83' for the liberation of these latter, to remove the rod 74, unscrew the screw 70, move the transfer member 14 perpendicularly to the disc so as to remove it from the brake shoes 12A, 12B and withdraw radially the transfer member 14.

It will of course be understood that the present invention is not restricted to the form of embodiment described and shown, but includes any alternative form of construction.

In particular, the end supporting faces of the brake-shoes are not necessarily flat; they could for example be curved or have the form of a dihedron. In the case of flat faces, they need not be either parallel or co-planar; they could for example conjointly form a dihedron.

Similarly, the transfer member could have the form of a ring arranged substantially along a chord of the disc 11, and the cylinder 13, instead of being blind and rigidly fixed on the transfer member 14, could be open at its two extremities and may comprise a second piston adapted to act on the transfer member 14.

Figure 9:
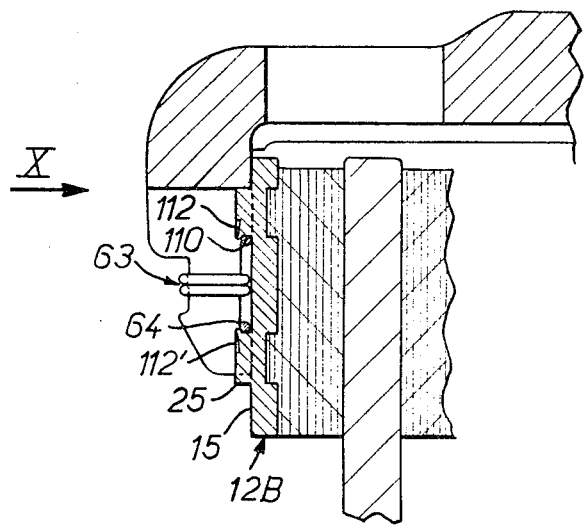
FIG. 9 is a view in partial axial cross-section similar to FIG. 1, and relates to an alternative form of embodiment.
Figure 10:
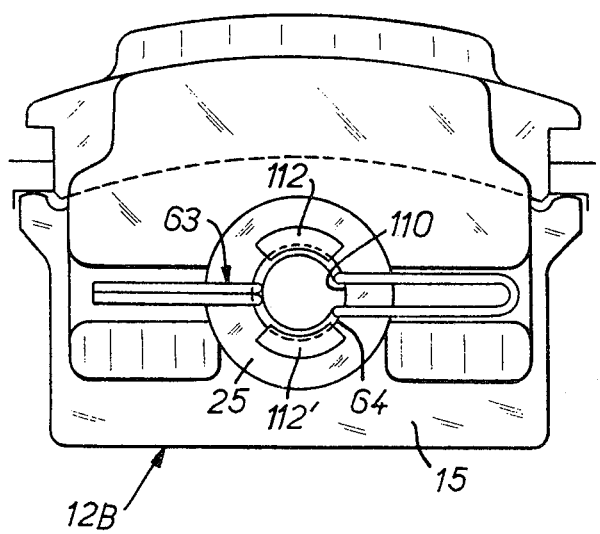
FIG. 10 is a view of this alternative form in partial elevation, taken in the direction of the arrow X of FIG. 9.

According to the form of embodiment illustrated by FIGS. 9 and 10, the boss 25 of the plate 15 of the shoe 12B is provided in its central zone with a bowl-shaped depression 110 which is also obtained by stamping the said plate, the spring 63 associated with this shoe 12B has its central part 64 shaped so as to have a contour complementary to that of the said depression 110, and is engaged by the said central zone 64 in the depression 110, and two diametrically opposite zones 112, 112' of the edge of this depression are inset on the central zone 64 of the spring 63 for the retention of this latter.

What I claim is:

1. A disc brake comprising a fixed support, a disc rotatably mounted with a shaft to be braked, a major part of the fixed support being substantially parallel to said disc, a brakeshoe disposed on each side of said disc for movement perpendicular to the plane of said disc, a transfer member mounted on said fixed support for movement perpendicular to the plane of the disc, a hydraulic operating unit acting directly on a first of said brakeshoes and indirectly on a second of said brakeshoes through said transfer member, resilient means for urging said transfer member into contact with retaining stop means, two brackets fixed to said major part of said fixed support and projecting outwardly from the side of said major part remote from said disc, each bracket having a flat surface perpendicular to said disc and to said major part and defining one of said retaining stop means, said flat surfaces being disposed in a common plane that is perpendicular to a radial plane that includes the axis of the disc and that bisects said transfer member, said transfer member having two laterally projecting substantially cylindrical coaxial lugs the common axis of which is parallel to said common plane and to the plane of the disc, said lugs being in line contact with and movable along said flat surfaces of said brackets, and each said lug being disposed between the said flat surface of the associated said bracket and the axis of said disc.

2. A disc brake as claimed in claim 1, wherein said lugs form the ends of a rod extending through a hole in said transfer member perpendicular to the axial plane of symmetry of said brake, there being clearance between the rod and the hole.

3. A disc brake as claimed in claim 2 wherein said rod is of generally cylindrical configuration.

4. A disc brake as claimed in claim 2 wherein the transverse dimension of the lugs is smaller than the transverse dimension of the central portion of the rod between the lugs, shoulders on the rod between the lugs and the central portion and cooperating with the corresponding brackets axially retaining said rod when said resilient means acts on said transfer member.

5. A disc brake as claimed in claim 1, wherein said resilient means comprises two bending springs disposed one on each side of said transfer member, each of said springs having a supporting zone in contact with said transfer member and said fixed support and also at least one lever arm having a free extremity hooked on said fixed support.

6. A disc brake as claimed in claim 5, wherein the supporting zone of each of said springs includes three successive contact areas, two of said contact areas being in contact with one of said members, a third area, intermediate the first two areas, being in contact with the other of said members.

7. A disc brake as claimed in claim 6, wherein said intermediate contact area is in contact with said transfer member.

8. A disc brake as claimed in claim 5, wherein the supporting zone of said bending springs is axially offset with respect to said disc, the intermediate supporting area of said springs extending beyond the plane of said disc.

9. A disc brake as claimed in claim 8, wherein each of said bending springs comprises two lever arms one on each side of said corresponding supporting zone.

10. A disc brake as claimed in claim 9, wherein at least one of said lever arms of each bending spring ending in a hook that engages said fixed support.

11. A disc brake as claimed in claim 9, wherein each bending spring is of round wire.

12. A disc brake as claimed in claim 9, wherein said bending springs are arranged so as to urge said transfer member radially outwardly from the axis of said disc towards the periphery thereof.

13. A disc brake as claimed in claim 1, wherein said first and second brakeshoes are identical.

14. A disc brake as claimed in claim 1, wherein said fixed support is generally T-shaped and comprises an end plate substantially parallel to said disc, there being a notch in the central zone of said end plate for receiving the first brakeshoe, and a bracket on each side of said notch extending substantially perpendicular to said end plate to each side thereof, along its edge nearest the periphery of said disc.

15. A disc brake as claimed in claim 1, wherein said hydraulic operating unit comprises a blind cylinder fixed to said transfer member.

16. A disc brake as claimed in claim 1, wherein said transfer member is generally U-shaped and extends substantially radially on said disc and said brakeshoes to each side of said brakeshoes.

17. A disc brake according to claim 1, said brakeshoes having friction linings on the same side as said disc, at least one of said brakeshoes having a supporting plate with a single axially projecting boss on said supporting plate having a closed contour, said boss being disposed on the face of said at least one brakeshoe opposite the associated said friction lining, the center of the boss lying in a plane of symmetry of said transfer member that passes through the axis of the disc.

18. A disc brake according to claim 17, wherein at least one of said brakeshoes has, on each side, lateral extensions each terminating in a supporting end face.

19. A disc brake as claimed in claim 18, wherein said supporting end faces of said lateral extensions of the supporting plate of said brakeshoe are flat.

20. A disc brake as claimed in claim 19, wherein said supporting end faces of said lateral extensions of the supporting plate of said brakeshoe are parallel to each other.

21. A disc brake as claimed in claim 19, wherein the end faces of the lateral extensions of the supporting plate of said brakeshoe are coplanar.

22. A disc brake as claimed in claim 18, wherein the supporting plate of said brakeshoe is substantially rectangular in shape, said lateral extensions of said plate extending symmetrically from two consecutive corner zones of said plate.

23. A disc brake as claimed in claim 2, wherein the edge of the supporting plate between the two lateral extensions is slightly convex.

24. A disc brake as claimed in claim 18, wherein each of the lateral extensions of the supporting plate comprises successively a first section oblique with respect to the edge of the plate from which it extends, and a second section substantially parallel to said edge.

25. A disc brake as claimed in claim 18, wherein said second brakeshoe has a boss, and said transfer member has a recess which is at least partly complementary with said boss and in engagement therewith, the end faces of said lateral extensions of the supporting plate of the second brakeshoe being in contact with two of said retaining stop means on said fixed support, whereby said transfer member is supported on said last-mentioned stop means by said second brakeshoe, successively through the lateral flank of the recess with which the boss is in engagement, and then part of the lateral flank of said boss and the lateral extensions on the support plate of said brakeshoe.

26. A disc brake as claimed in claim 25, wherein the recess in said transfer member that receives the boss of the second brakeshoe has a lateral slot whose width is smaller than the corresponding dimension of said boss.

27. A disc brake as claimed in claim 26, further comprising fixing means provided between said transfer member and the second brakeshoe, said fixing means comprising a screw threadedly engaged in the boss of said second brakeshoe, and a resilient pin supported at its midsection on said screw and at its extremities to each side of said transfer member.

28. A disc brake as claimed in claim 27, in which said resilient pin is a generally U-shaped hair pin, the midsection of which is offset perpendicular to the median plane of the rest of the pins, and wherein the arms of the pin form a circular opening in the central zone of said midsection.

29. A disc brake as claimed in claim 28, wherein said resilient pin is biased in position for urging the corresponding brakeshoe against said transfer member.

30. A disc brake as claimed in claim 17, wherein said boss on the supporting plate is stamped therein.

31. A disc brake as claimed in claim 17, wherein said boss on the supporting plate has a cylindrical flank with a circular contour.

32. A disc brake as claimed in claim 17, wherein the entire boss is located at a distance from the periphery of said plate.

33. A disc brake as claimed in claim 32, there being an opening in said transfer member in a portion thereof substantially parallel to the axis of said disc.

34. A disc brake as claimed in claim 17, there being a screw-threaded hole in the central zone of said boss.

35. A disc brake as claimed in claim 17, wherein the central zone of the boss of the supporting plate comprises a bowlshaped depression.

36. A disc brake according to claim 1, wherein said lugs are located on opposite sides of said radial plane.

* * * * *